(12) United States Patent
Sakurai et al.

(10) Patent No.: US 8,778,162 B2
(45) Date of Patent: Jul. 15, 2014

(54) STAMPER AND METHOD OF MANUFACTURING THE SAME

(75) Inventors: Masatoshi Sakurai, Tokyo (JP); Takuya Shimada, Kawasaki (JP); Shinobu Sugimura, Yokohama (JP); Satoshi Shirotori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 13/077,537

(22) Filed: Mar. 31, 2011

(65) Prior Publication Data

US 2011/0262580 A1  Oct. 27, 2011

(30) Foreign Application Priority Data

Apr. 27, 2010  (JP) .................. 2010-102572

(51) Int. Cl.
 *C25D 1/00* (2006.01)
 *C25D 1/20* (2006.01)

(52) U.S. Cl.
 USPC .......................................................... 205/67

(58) Field of Classification Search
 USPC .......................................................... 205/67
 See application file for complete search history.

(56) References Cited

U.S. PATENT DOCUMENTS

| | | | |
|---|---|---|---|
| 6,503,384 B1 * | 1/2003 | Teshima et al. | 205/118 |
| 6,632,342 B1 * | 10/2003 | Teshima et al. | 205/118 |
| 2004/0004300 A1 * | 1/2004 | Yamaguchi et al. | 264/1.33 |
| 2011/0084424 A1 * | 4/2011 | Kaida et al. | 264/293 |

FOREIGN PATENT DOCUMENTS

| | | | | |
|---|---|---|---|---|
| JP | 10235652 A | 9/1998 | | |
| JP | 10241214 A | 9/1998 | | |
| JP | 2003-071849 A | 3/2003 | | |
| JP | 2005-133166 A | 5/2005 | | |
| JP | 2006-048879 A | 2/2006 | | |
| JP | 2008168465 A | 7/2008 | | |
| JP | 2010017865 A | 1/2010 | | |
| WO | WO 2009-096722 A2 | 8/2009 | | |
| WO | WO 2009096722 A2 * | 8/2009 | | B29C 59/15 |

* cited by examiner

*Primary Examiner* — Edna Wong

(74) *Attorney, Agent, or Firm* — Knobbe Martens Olson & Bear LLP

(57) ABSTRACT

According to one embodiment, a stamper manufacturing method comprises electroless plating by using a master includes a substrate, a conductive underlayer formed on the substrate and having catalytic activity, projecting patterns having no catalytic activity and partially formed on a surface of the conductive underlayer having catalytic activity, and regions in which the conductive underlayer having catalytic activity is exposed between the projecting patterns to deposit selectively an amorphous conductive layer between the projecting patterns and in the regions in which the conductive underlayer is exposed, and forming stamper projections, electroplating on the stamper projections includes the projecting patterns and the amorphous conductive layer by using the amorphous conductive layer and the conductive underlayer as electrodes to form a stamper main body made of a crystalline metal, and releasing a stamper includes the stamper projections and the stamper main body from the master.

6 Claims, 10 Drawing Sheets

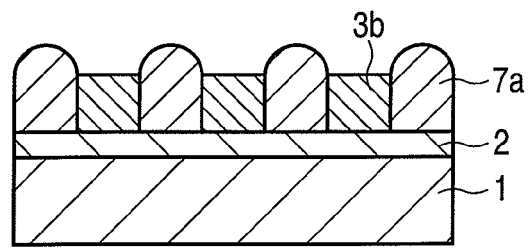
F I G. 4A
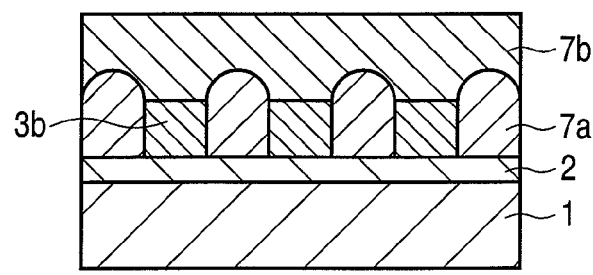
F I G. 4B
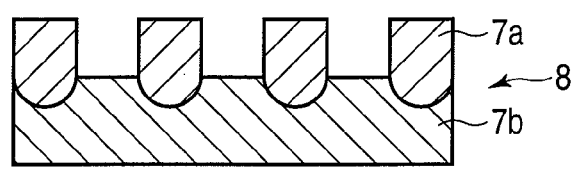
F I G. 4C
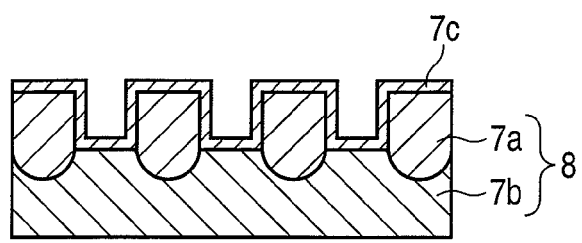
F I G. 4D

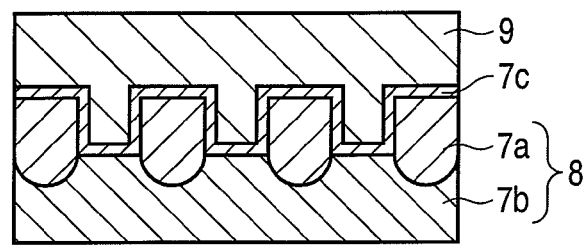
F I G. 4E
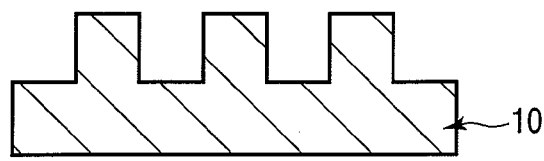
F I G. 4F
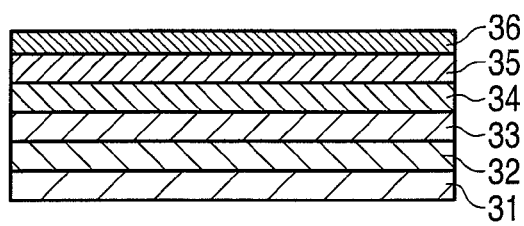
F I G. 5A
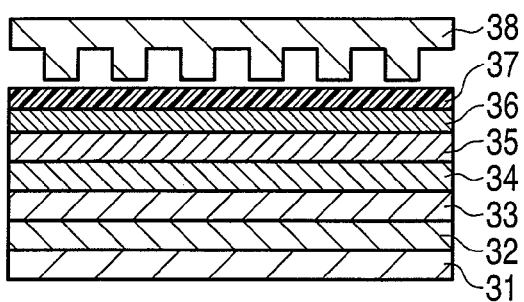
F I G. 5B

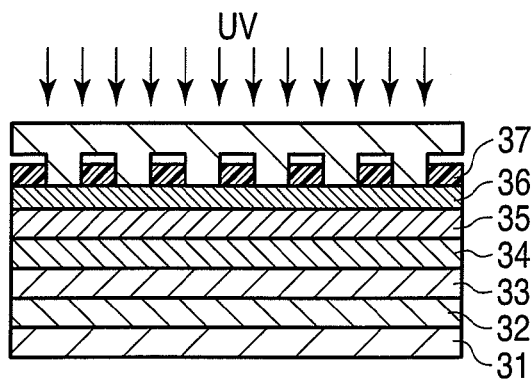
F I G. 5C
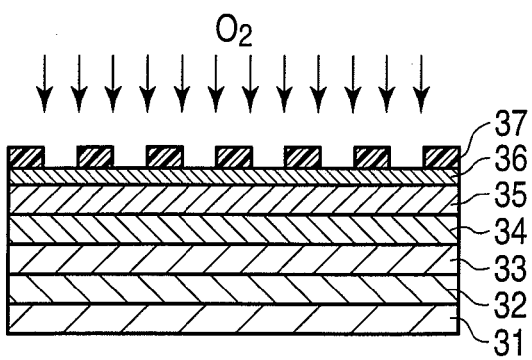
F I G. 5D
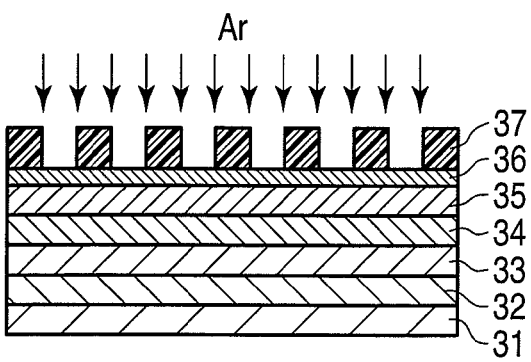
F I G. 5E

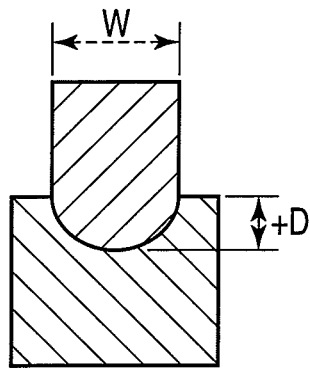
F I G. 6
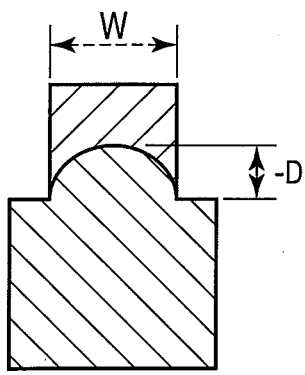
F I G. 7
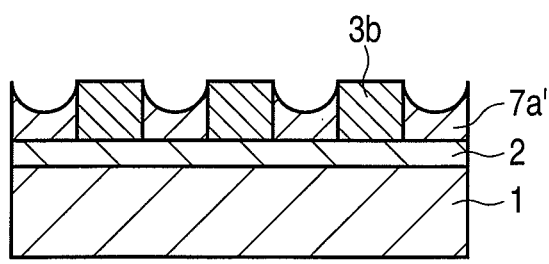
F I G. 8A

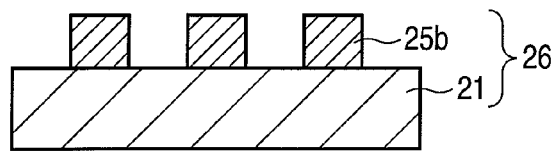
F I G. 11A
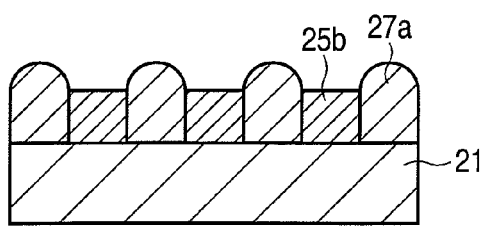
F I G. 11B
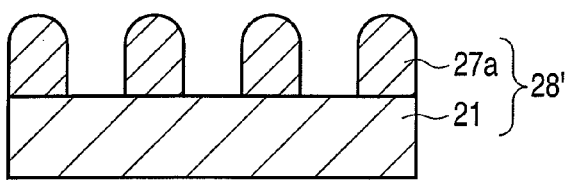
F I G. 11C
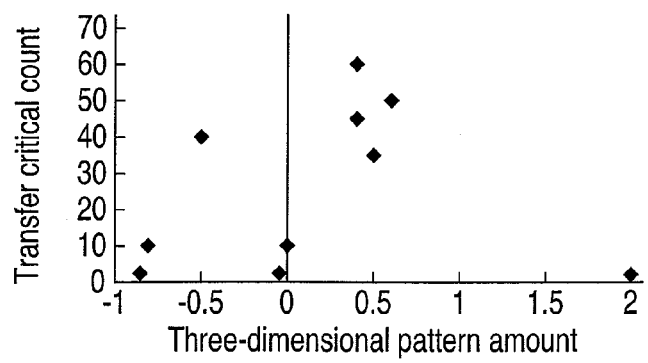
F I G. 12

… … …

STAMPER AND METHOD OF MANUFACTURING THE SAME

CROSS-REFERENCE TO RELATED APPLICATIONS

This application is based upon and claims the benefit of priority from Japanese Patent Application No. 2010-102572, filed Apr. 27, 2010; the entire contents of which are incorporated herein by reference.

FIELD

Embodiments described herein relate generally to a stamper to be used to duplicate a resin stamper for transferring a discrete track form or bit-patterned form onto the surface of a magnetic recording layer.

BACKGROUND

With the increase in track density of hard disk drives in recent years, interference between adjacent tracks has become a matter of concern. In particular, reducing side write due to the magnetic field fringe effect of the recording head is an important issue. A discrete track recording (DTR) medium, in which recording tracks are physically separated, can reduce side erase during recording and side read, in which crosstalk from an adjacent track occurs, during reproduction, thereby increasing the density in the cross-track direction. This makes the DTR medium promising as a high-density magnetic recording medium. In addition, a bit-patterned medium (BPM) physically divided in the bit direction has been proposed as a high-density magnetic recording medium capable of suppressing medium noise and thermal decay, in which recorded data disappears at room temperature.

Since the DTR medium and BPM are manufactured by means of the etching processing technique, the manufacturing cost may higher than normal. Therefore, the following method has been proposed. That is, fine patterns obtained by electron beam (EB) lithography are transferred to a master, and a mother (or master) stamper such as an Ni stamper is duplicated from the master by electroforming. The mother stamper is then set in an injection molding machine, and resin stampers are mass-produced by injection molding. The DTR medium or BPM is manufactured by ultraviolet (UV) curing imprinting using the resin stamper.

When manufacturing the DTR medium or BPM, it is necessary to transfer fine patterns 1/10 or less the size of patterns formed on optical disks. When patterns are made smaller as the recording density increases, however, it often becomes difficult to duplicate the mother stamper from the master by electroforming. Therefore, demands for a high releasability and high durability of the mother stamper are increasing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 4A, 4B, 4C, 4D, 4E, and 4F are an exemplary view showing an embodiment of a process of manufacturing a master stamper using the master shown in FIGS. 1A to 1E;

FIGS. 5A, 5B, 5C, 5D, 5E, 5F, 5G, 5H, and 5I are an exemplary view showing an embodiment of a process of manufacturing a DTR medium or BPM;

FIG. 6 is an exemplary view showing an embodiment of a boundary surface between a stamper main body and a projection of the stamper;

FIG. 7 is an exemplary view showing another embodiment of the boundary surface between the stamper main body and the projection of the stamper;

FIGS. 8A, 8B, and 8C are an exemplary view showing another embodiment of the process of manufacturing the master stamper using the master shown in FIGS. 1A to 1E;

FIGS. 11A, 11B, and 11C are an exemplary view showing a process of manufacturing a master stamper for comparison; and FIG. 12 is an exemplary view showing a graph representing the relationship between the stamper three-dimensional pattern amount and transfer critical count.

DETAILED DESCRIPTION

Various embodiments will be described hereinafter with reference to the accompanying drawings.

In general, according to one embodiment, there is provided a stamper manufacturing method including performing electroless plating by using a master including a substrate, a conductive underlayer having catalytic activity, and projecting patterns, performing electroplating by using the conductive underlayer and electroless plating layer as electrodes, thereby stacking the electroplating layer on the electroless plating layer, and releasing the electroless plating layer and electroplating layer from the master.

In this method, the master includes the conductive underlayer having catalytic activity and the projecting patterns having no catalytic activity sequentially stacked on the substrate, and has regions where the conductive underlayer is exposed between the projecting patterns.

In this method, the electroless plating layer is an amorphous conductive layer and deposited between the projecting patterns and in the regions where the conductive underlayer is exposed, thereby forming stamper projections.

In this method, the electroplating layer is made of a crystalline metal and formed on the stamper projections and projecting patterns, thereby forming a stamper main body.

In this method, a stamper is obtained by releasing the stamper projections made of the electroless plating layer and the stamper main body made of the electroplating layer, from the conductive underlayer and projecting patterns.

Also, a stamper according to another embodiment includes a stamper main body, and stamper projections formed on one major surface of the stamper main body, wherein the boundary surface between the stamper main body and stamper projection is not flat but has at least a recessed form or projecting form with respect to the one major surface of the stamper main body.

Embodiments will be explained in detail below with reference to the accompanying drawings.

Master Manufacturing Method (Conductive Underlayer Formation Step)

FIGS. 1A to 1E are views showing the steps of manufacturing a master according to an embodiment.

Figure 1A:
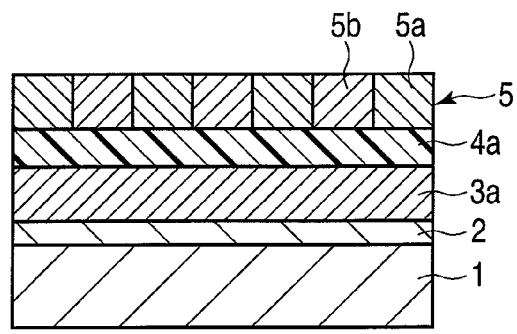
FIGS. 1A, 1B, 1C, 1D and 1E are exemplary views showing a process of manufacturing a master according to an embodiment.

First, as shown in FIG. 1A, a 625-µm-thick Si substrate 1 having a diameter of 6 inches was prepared as a substrate, and a 20-nm-thick conductive underlayer 2 made of Pd was deposited on the substrate 1 by sputtering by applying a DC power of 100 W at a pressure of 0.35 Pa. As the substrate 1, glass or an Si base can also be used. The substrate thickness can be, e.g., 525 to 725 µm. Also, the substrate diameter can be, e.g., 3 to 8 inches in accordance with the standards.

The material of the conductive underlayer 2 is not limited to Pd, provided that the material has a resistance to reactive ion etching (RIE) using a fluorine-based gas or gaseous oxygen, and has a low electrical resistance. For example, it is possible to use a general conductive metal such as Al, Ti, Fe, Co, Cu, Ag, Ta, W, or Au, or a metal, such as Ni, Ru, Pd, or Pt, having resistance to RIE and exerting a strong catalytic action on an electroless plating reaction (described later). The deposition method is physical vapor deposition or chemical vapor deposition. The film thickness of the conductive underlayer 2 can be, e.g., 2 to 50 nm.

(Pattern Layer Formation Step)

Subsequently, a pattern layer 3a was formed on the conductive underlayer 2. That is, a 40-nm-thick Si layer was deposited as the pattern layer 3a by sputtering at 200 W DC and 0.6 Pa. The etching selectivity of the pattern layer 3a can be made higher than that of a mask layer 4a (described later). The expression "the etching selectivity is high" herein means that the etching rate is higher than that of the mask layer 4a under the same etching conditions. Si of the pattern layer 3a has an RIE rate for a fluorine-based gas higher than that of C of the mask layer 4a. The film thickness of the pattern layer 3a is the three-dimensional pattern height of a master, and hence is not particularly limited as long as the film thickness is equal to the target three-dimensional pattern height. For example, the film thickness can be 20 to 50 nm. Amorphous Si or fine crystal Si (microcrystalline or polycrystalline silicon) is obtained by depositing the pattern layer 3a on the conductive underlayer 2 by physical vapor deposition or chemical vapor deposition. Also, when the pattern recess surface is made of the conductive underlayer 2, an adhesion layer (not shown) can be inserted, as a part of the pattern layer 3a, between the pattern layer 3a and conductive underlayer 2. Examples of the adhesion layer are metals such as Ti, Ni, and Cr, and alloys of these metals.

(Mask Layer Formation Step)

Then, the mask layer 4a was formed on the pattern layer 3a. The etching selectivity of the mask layer 4a can be made higher than that of an EB lithography resist (described later), and lower than that of the Si substrate. The number of layers and the material of the mask layer 4a are not particularly limited. The expression "the etching selectivity is high" herein means that the etching rate is higher than that of the EB lithography resist under the same etching conditions. A multilayered structure can be used to simply perform etching by using a fluorine-based gas or gaseous oxygen. A mask having a high aspect ratio can be formed by using the multilayered mask layer 4a made of Si and C. For example, Si and C are deposited by thicknesses of 3 and 40 nm, respectively, at 200 W DC and 0.6 Pa. Si has an RIE rate for a fluorine-based gas higher than that of the EB lithography resist, and C has an RIE rate for gaseous oxygen higher than that of Si. The deposition method is physical vapor deposition or chemical vapor deposition. The thickness of the mask layer 4a can be 2 to 50 nm because no uniform film can be obtained if the thickness is less than 2 nm, and the roughness increases if the thickness exceeds 50 nm. The mask layer 4a must have a thickness with which the layer can withstand desired etching, and the thickness can be selected in accordance with the etching selectivity of the material.

(Patterning Step)

Figure 1B:
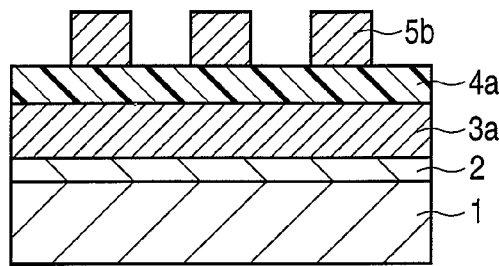

The substrate 1 on which the layers up to the mask layer 4a were deposited was spin-coated with a resist solution prepared by diluting resist ZEP-520A available from Zeon to twice the volume with anisole and filtering the solution by a 0.05-µm filter, and the substrate was prebaked at 200° C. for 3 minutes, thereby forming a resist layer 5 about 40 nm thick. An electron beam lithography apparatus having a ZrO/W thermal field emission type electron gun emitter was used to directly write desired patterns, i.e., line-and-space (L & S) patterns 5a and 5b at a pitch of 100 nm and a groove width of 50 nm on the resist 5 on the substrate 1 at an acceleration voltage of 50 kV, thereby obtaining surface three-dimensional latent image patterns 5a. Subsequently, the resist was developed by dipping the substrate in developer ZED-N50 (available from Zeon) for 90 s, and the substrate was rinsed as it was dipped in ZMD-B (available from Zeon) for 90 s. The substrate was then dried by air blow, and resist patterning was performed, thereby obtaining surface projecting patterns 5b, as shown in FIG. 1B.

Figure 2:
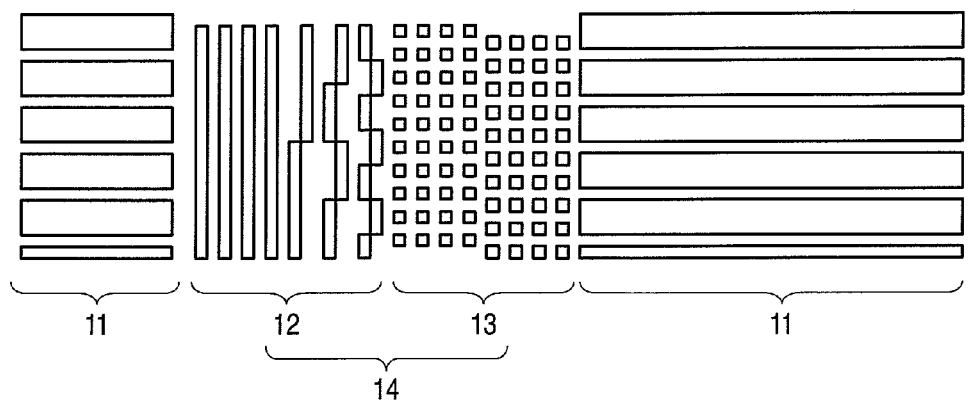
FIG. 2 is an exemplary view showing three-dimensional patterns in which recording tracks and information for positioning a recording/reproduction head are recorded.
Figure 3:
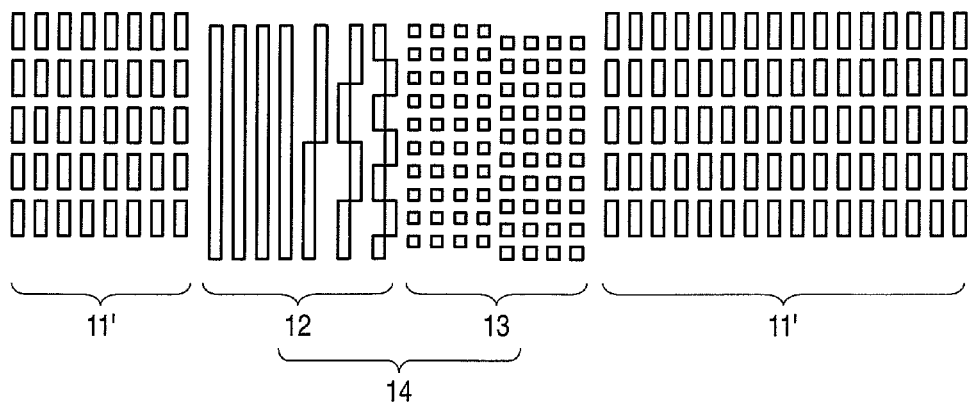
FIG. 3 is an exemplary view showing three-dimensional patterns in which recording bits and information for positioning a recording/reproduction head are recorded.

FIG. 2 is a front view showing an example of three-dimensional patterns in which recording tracks and information for positioning a recording/reproduction head are recorded. FIG. 3 is a front view showing an example of three-dimensional patterns in which recording bits and information for positioning a recording/reproduction head are recorded.

Examples of the above-mentioned lithography patterns are patterns corresponding to track patterns 11 formed in a data area and servo area patterns 14 formed in a servo area and including preamble address patterns 12 and burst patterns 13 as shown in FIG. 2, and patterns corresponding to bit patterns 11' formed in the data area and the servo area patterns 14 formed in the servo area and including the preamble address patterns 12 and burst patterns 13 as shown in FIG. 3.

(Etching Step)

Figure 1C:
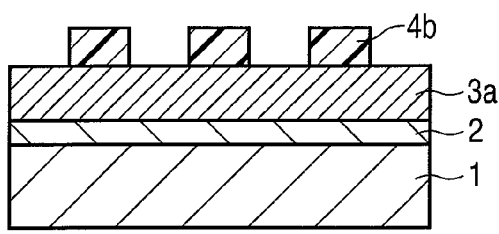
Figure 1D:
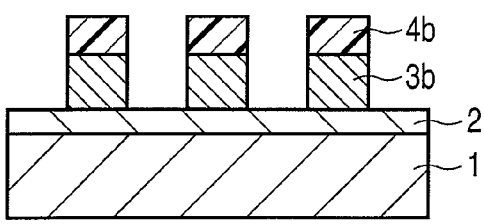

The Si mask layer of the multilayered mask layer 4a was etched based on the surface projecting patterns 5b by using an inductively coupled plasma (ICP) etching apparatus. For example, the Si mask layer was etched by using $CF_4$ as a process gas at a chamber pressure of 0.1 Pa, an antenna power of 100 W, and a bias power of 5 W. Subsequently, the C mask layer was etched based on the Si mask layer by using gaseous oxygen. For example, the C mask layer was etched by using $O_2$ as a process gas at a chamber pressure of 0.1 Pa, an antenna power of 100 W, and a bias power of 5 W, thereby obtaining a recessed mask layer 4b, as shown in FIG. 1C. In this process, the three-dimensional patterns of the EB lithography resist were simultaneously removed. Then, Si of the pattern layer 3a was etched based on the mask layer 4b. For example, Si of the pattern layer 3a was etched by using $CF_4$ as a process gas at a chamber pressure of 0.1 Pa, an antenna power of 100 W, and a bias power of 5 W, thereby obtaining a projecting pattern layer 3b, as shown in FIG. 1D. In this process, the Si mask layer of the multilayered mask layer 4a was simultaneously removed.

(Ashing Step)

Figure 1E:
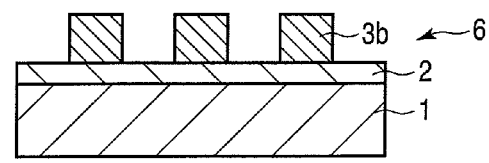

The ICP etching apparatus was used to remove the C mask layer of the multilayered mask layer 4a by gaseous oxygen. For example, the C mask layer was removed by using $O_2$ as a process gas at a chamber pressure of 0.1 Pa, an antenna power of 400 W, and a bias power of 0 W, thereby obtaining a master 6. As shown in FIG. 1E, the plurality of projecting patterns 3b made of Si were formed on the master 6, and the conductive underlayer 2 was exposed to the bottom surfaces of the recesses between the projecting patterns 3b.

(Stamper Manufacturing Method)

A method of manufacturing a master stamper by using the above-mentioned master 6 will be described below with reference to FIGS. 4A to 4C.

The master 6 is placed on the table of an electroless nickel plating apparatus, e.g., PEN-101 manufactured by Techno Okabayashi, and the substrate is rotated at 150 rpm at 90° C. An electroless plating solution prepared by the following composition was dropped on the master 6.

Electroless Plating Solution Composition

Nickel sulfate: 30 g/L

Sodium hypophosphite monohydrate: 10 g/L

Sodium citrate: 10 g/L

Bath temperature: 90° C.

pH: 5.0

An amorphous conductive layer can be obtained by using the electroless plating solution having the above composition.

The Pd surface as the conductive underlayer 2 has catalytic activity and reacts with the above-mentioned plating solution, but the projecting pattern layers 3b made of Si have no activity and do not react with the plating solution. Therefore, an electroless plating film 7a is selectively deposited in the recesses between the plurality of projecting pattern layers 3b. The deposition time can be adjusted by the depth of the recesses between the pattern layers 3b.

For example, when setting the projecting pattern layer height to 40 nm, the plating time was adjusted to 15 s so as to deposit the electroless plating film 7a to a position higher than 40 nm. After the plating is complete, the heating is interrupted, and the master is immediately washed with pure water to remove the plating solution and stop the reaction. When the master is dried after that, as shown in FIG. 4A, the electroless Ni plating film 7a serving as stamper projections is deposited in the recesses between the projecting pattern layers 3b to a position higher than the height of the projecting pattern layers 3b. It is also possible to deposit the electroless plating film to a position lower than the height of the projecting pattern layers.

The material of the electroless plating film 7a is not limited to Ni. For example, it is possible to use a material such as Co, Pd, Cu, Ag, or Au generally processable by electroless plating. Also, the deposited electroless plating film 7a is alloyed with, e.g., P, and is amorphous. Accordingly, the material of the electroless plating film 7a is not limited to Ni—P as long as the material is an amorphous Ni alloy, and it is possible to use, e.g., Ni—B, Ni—P—B, or Ni—W—B.

After that, the conductive underlayer 2 is exposed to the outer edge of the master shown in FIG. 4A and brought into contact with a conductive ring of an electroforming jig, so that the conductive underlayer 2 and stamper projections 7a function as plating electrodes. Subsequently, Ni electroforming is performed for 120 minutes by dipping the master in a nickel sulfamate plating solution, e.g., NS-160 available from Showa Chemical, thereby forming an electroformed film 7b about 300 μm thick, as shown in FIG. 4B. The electroforming bath conditions are as follows.

Electroforming Bath Conditions

Nickel sulfamate: 600 g/L

Boric acid: 40 g/L

Surfactant (sodium lauryl sulfate): 0.15 g/L

Solution temperature: 50° C.

pH: 3.85

Current density: 10 A/dm$^2$

Then, as shown in FIG. 4C, the integrated layer of the projections 7a and main body 7b is released from the master in a vacuum. The stamper manufactured as described above will be called a master stamper 8.

This master stamper has a high hardness and high releasability because the projections 7a are formed by the amorphous conductive layer. The boundary surface between the projection 7a and main body 7b has a form including at least a recessed form or projecting form with respect to one major surface of the stamper main body. Since this increases the contact area of the boundary surface between the projection 7a and main body 7b when compared to a flat boundary surface, the strength increases, and a high durability is obtained even when the stamper main body and stamper projections have different compositions.

After that, a passivation process is performed on the stamper surface by oxygen RIE, thereby oxidizing the surface and obtaining an oxide layer (not shown). More specifically, oxygen RIE was performed for 3 minutes by applying a power of 100 W to a chamber in which the pressure was adjusted to 4.0 Pa by supplying gaseous oxygen at 100 mL/minute. As shown in FIG. 4D, a conductive film 7c is deposited on the oxide layer surface by sputtering by using, e.g., Ni as a target, and an electroformed layer 9 is formed by using the conductive film 7c as a plating electrode, thereby obtaining a mother stamper 10 including the conductive film 7c and electroformed layer 9. The master stamper 8 and mother stamper 10 can be separated from the oxide layer (not shown). After that, the master stamper 8 and mother stamper 10 undergo the steps of spin-coating the three-dimensional pattern surface with a projective film and drying the film, and other steps such as back surface polishing and punching as needed, thereby completing a stamper for transferring a large amount of media as a final form.

The stamper projections can be formed by an amorphous alloy of nickel, and the stamper main body can be formed by a crystalline metal containing nickel as a main component.

The stamper projections can have a pattern formed to have a width of 50 nm in the short-axis direction, and a size of 10 to 100 nm.

The stamper projections can have a structure in which they are separately connected to the above-mentioned main body.

Note that a "main component" herein means an element or elements having the highest component ratio among components forming the substance.

Next, a method of manufacturing a DTR medium or BPM will be described with reference to FIGS. 5A to 5I.

First, the Ni stamper manufactured by the method explained with reference to FIGS. 1A to 1E and FIGS. 4A to 4F is set in an injection molding apparatus (manufactured by Toshiba Machine), and a resin stamper is manufactured. The molding material is cyclic olefin polymer Zeonor 1060R available from Zeon, but polycarbonate material AD5503 available from Teijin Chemicals can also be used. After that, as shown in FIG. 5A, a 120-nm-thick soft magnetic layer 32 (CoZrNb), 20-nm-thick orientation controlling underlayer 33 (Ru), 15-nm-thick ferromagnetic recording layer 34 (CoCrPt—SiO$_2$), and 15-nm-thick protective layer 35 (C) are sequentially deposited on a glass substrate 31. A metal layer 36 (3 to 5 nm) is deposited on the protective layer 35. A metal used as the metal layer 36 is one having high adhesion to a photopolymer (2P) agent, and completely removable by etching using gaseous He+$N_2$ in a step shown in FIG. 5G. Practical examples are CoPt, Cu, Al, NiTa, Ta, Ti, Si, Cr, NiNb, and ZrTi. Of these materials, CoPt, Cu, and Si are particularly superior in balance between the 2P agent adhesion and the removability by gaseous He+$N_2$.

Note that the 2P agent is an ultraviolet-curing material made of a monomer, oligomer, and polymerization initiator, and does not contain any solvent.

As shown in FIG. 5B, a UV-curing resin layer 37 is formed by spin-coating the metal layer 36 with a 50-nm-thick photopolymer (2P) agent. The 2P agent is an ultraviolet-curing material made of a monomer, oligomer, and polymerization initiator. An example is a material containing isobornyl acrylate (IBOA) as a monomer, polyurethane diacrylate (PUDA) as an oligomer, and Darocur 1173 as a polymerization initiator, such that the contents of IBOA, PUDA, and the polymerization initiator are respectively 85%, 10%, and 5%. After that, a resin stamper 38 is used to perform imprinting on the UV-curing resin layer 37, as shown in FIG. 5C.

Subsequently, gaseous oxygen is used to remove the imprinting residue by using an ICP etching apparatus. For example, the residue formed by the imprinting process is removed by using oxygen as a process gas at a chamber pressure of 2 mTorr, a coil RF of 100 W, and a platen RF of 100 W for an etching time of 30 s, as shown in FIG. 5D.

The metal layer 36 is then etched by ion beam etching using gaseous Ar, as shown in FIG. 5E. This step is not always necessary and may be omitted because, for example, the metal layer 36 can also be etched by increasing the anisotropy (e.g., increasing the platen RF of the ICP conditions to about 300 W) in the imprinting residue removing step, as shown in FIG. 5D. When using Si as the metal layer 36, ion beam etching using gaseous $CF_4$ can also be used.

In the imprinting residue removing step, the resist residue is removed by RIE. The plasma source is preferably an inductively coupled plasma (ICP) that can be generated with a high density at a low pressure. However, it is also possible to use an electron cyclotron resonance (ECR) plasma or a general parallel-plate RIE apparatus. Gaseous oxygen can be used as the 2P agent.

Figure 5F:
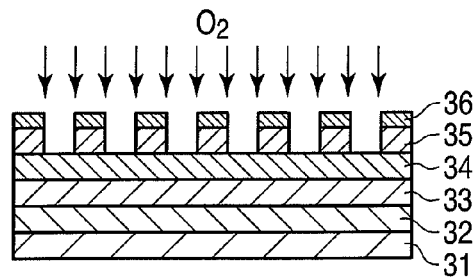

After that, the protective layer 35 is etched by the ICP etching apparatus by using gaseous oxygen. As shown in FIG. 5F, a C mask is then formed by using oxygen as a process gas at a chamber pressure of 2 mTorr, a coil RF of 100 W, and a platen RF of 100 W for an etching time of 30 s.

Figure 5G:
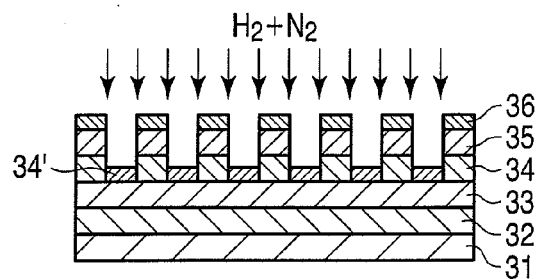

As shown in FIG. 5G, ion beam etching is performed through the formed C mask by using He or He+$N_2$ (mixing ratio of 1:1). ECR is preferably used in the ionization of the gas. For example, etching is performed at a microwave power of 800 W and an acceleration voltage of 1,000 V for 20 s, thereby forming 10-nm-thick three-dimensional patterns that partially divide the ferromagnetic recording layer 34. A 5-nm-thick residue of the ferromagnetic recording layer 34 deactivates the magnetism owing to the effect of the exposure to He+$N_2$, thereby forming a magnetism-deactivated layer 34'.

In this step, it is important to completely remove the metal layer 36 (e.g., Cu) deposited in the step shown in FIG. 5A at the same time. This is so because if the metal layer 36 remains, the C mask protected by the metal layer cannot be removed in the next C mask removing step performed by RIE using gaseous oxygen.

Figure 5H:
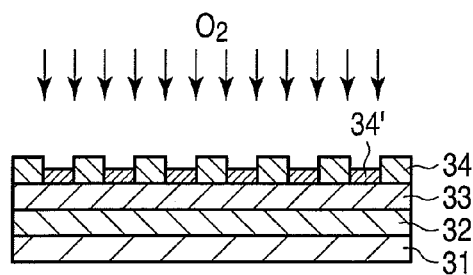

After that, the C mask is removed by RIE using gaseous oxygen at 100 mTorr and 100 W for an etching time of 30 s, as shown in FIG. 5H. It is also possible to readily remove the C mask by oxygen plasma processing. In this step, a carbon protective layer on the surface of a perpendicular magnetic medium is also removed.

Figure 5I:
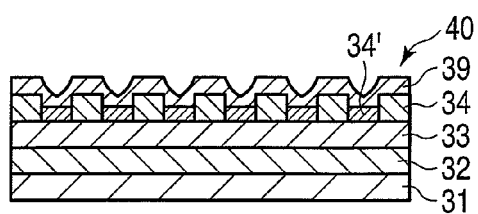

Finally, as shown in FIG. 5I, a 4-nm-thick surface C protective film 39 is formed by chemical vapor deposition (CVD) and coated with a lubricant, thereby obtaining a DTR medium 40 or BPM.

The C protective film is desirably deposited by CVD in order to improve the coverage to the three-dimensional patterns. However, the C protective film may be deposited by sputtering or vacuum deposition. When forming the C protective film by CVD, a diamond-like-carbon (DLC) film containing a large amount of $sp^3$-bonded carbon is formed. If the film thickness is 2 nm or less, the coverage worsens. If the film thickness is 10 nm or more, the magnetic spacing between a magnetic recording/reproduction head and the medium increases, and this often decreases the signal-to-noise ratio (SNR). A lubricating layer can also be formed on the protective layer. As a lubricant for use in the lubricating layer, it is possible to use a conventionally known material, e.g., perfluoropolyether, alcohol fluoride, or fluorinated carboxylic acid.

The embodiments will be explained in more detail below by way of their examples.

Example 1

In the stamper manufacturing process, stamper projections were formed under the following electroless plating conditions.

Nickel sulfate: 30 g/L
Sodium hypophosphite monohydrate: 10 g/L
Sodium citrate: 10 g/L
Bath temperature: 90° C.
pH: 5.0
Plating time: 15 s Consequently, it was confirmed by atomic force microscope (AFM) that the plated three-dimensional patterns were inverted as the recesses of the master were filled up to form projections.

A master stamper manufactured by depositing an electroformed film after that had a three-dimensional form as the reverse of the patterns of the master, on the main body surface as shown in FIG. 4C. The stamper projections and stamper main body were made of NiP and Ni, i.e., different compositions, and the main body side had the boundary surface between the stamper projection and stamper main body. That is, the boundary surface had at least a form recessed in one major surface of the stamper main body.

As shown in FIG. 6, let W be the width in the short-axis direction of the boundary surface between the stamper main body and stamper projection, and D be the depth when the boundary surface has a form recessed in the surface of the stamper main body. Also, as shown in FIG. 7, let −D be the height when the boundary surface has a form projecting from the surface of the stamper main body. This means that D is 40 nm when the depth of the recessed form is 40 nm, and is −40 nm when the height of the projecting form is 40 nm. A three-dimensional pattern amount X of the boundary surface is calculated by D/W. D/W can be represented by −0.6 to −0.4 when the boundary surface has a projecting form, and +0.4 to +0.6 when the boundary surface has a recessed form.

In this example, W was 50 nm and D was 30 nm, so that D/W was 0.6.

When X-ray analysis was performed on a film deposited on a master having no three-dimensional patterns under the above-mentioned plating conditions, the film was found to have an amorphous structure having only a broad peak near $2\theta=52°$. The projections of this stamper were also made of only NiP, i.e., an amorphous alloy composition, and the stamper main body was made of a crystalline metal containing Ni as a main component.

When this master stamper was used to repetitively duplicate and release mother stampers, the three-dimensional patterns neither broke nor deteriorated even when the number of repetitions exceeded 50.

Example 2

Figure 8B:
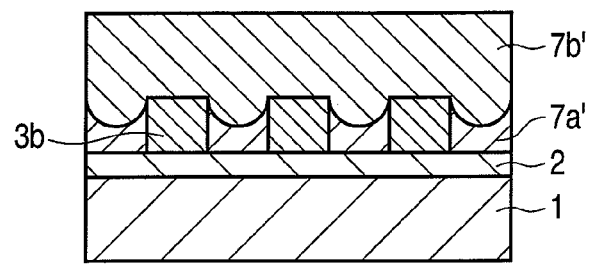
Figure 8C:
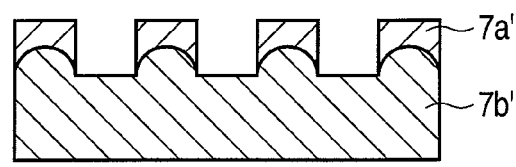

In the stamper manufacturing process, stamper projections were formed under the following electroless plating conditions.
Nickel sulfate: 30 g/L
Sodium hypophosphite monohydrate: 10 g/L
Sodium citrate: 10 g/L
Bath temperature: 90° C.
pH: 5.0
Plating time: 5 s FIGS. 8A to 8C are views showing another embodiment of the process of manufacturing a mother stamper using the master shown FIGS. 1A to 1E.

As shown in FIG. 8A, it was confirmed by AFM that the electroless plating layer was deposited in the recesses between the plated projecting patterns to a position lower than the projecting pattern height of the master. A master stamper manufactured by depositing an electroformed film after that had a three-dimensional form as the reverse of the patterns of the master, on the main body surface as shown in FIG. 8C. The projections and main body were made of different compositions, and the projection side had the boundary surface between the projection and main body. That is, the boundary surface between the stamper main body and stamper projection had a form projecting from one major surface of the stamper main body.

In this example, W was 50 nm and D was −25 nm, so that D/W was −0.5.

When this master stamper was used to repetitively duplicate and release mother stampers, the three-dimensional patterns neither broke nor deteriorated even when the number of repetitions exceeded 40.

Example 3

In the stamper manufacturing process, stamper projections were formed under the following electroless plating conditions.
Nickel sulfate: 30 g/L
Dimethylamineborane: 3.4 g/L
Sodium succinate: 55 g/L
Boric acid: 30 g/L
Ammonium chloride: 30 g/L
Bath temperature: 60° C.
pH: 6.0
Plating time: 35 s Consequently, it was confirmed by AFM that the electroless plating layer was deposited in the recesses between the plated projecting patterns to a position higher than the projecting pattern height, and the three-dimensional patterns were the reverse of those of the master before electroless plating was performed. A master stamper manufactured by depositing an electroformed film after that had a three-dimensional form as the reverse of the patterns of the master, on the main body surface as shown in FIG. 4C. The projections and main body were made of NiB and Ni, i.e., different compositions, and the main body side had the boundary surface between the projection and main body. In this example, W was 50 nm and D was 20 nm, so that D/W was 0.4.

When X-ray analysis was performed on a film deposited under the above-mentioned plating conditions, the film was found to have an amorphous structure having only a broad peak near $2\theta=53°$. The projections of this stamper were also made of only NiB, i.e., an amorphous alloy composition, and the stamper main body was made of a crystalline metal containing Ni as a main component.

When this master stamper was used to repetitively duplicate and release mother stampers, the three-dimensional patterns neither broke nor deteriorated even when the number of repetitions exceeded 60.

Example 4

In the patterning step in the manufacture of the master, a resist and EB lithography apparatus were used to form surface three-dimensional patterns 5b as guide patterns by using a self-organization material. For example, a substrate on which layers up to a mask layer were deposited was coated with a material mixture of polystyrene (PS) and polydimethylcyloxane (PDMS) or PS and polyethyleneoxide (PEO)-silicon-on-glass (SOG), and annealed at 200° C. for 12 hours, thereby forming patterns divided into a PS matrix having a diameter of 20 nm and a PDMS sphere, or a PS sphere having a diameter of 20 nm and a PEO-SOG matrix. After that, PS was removed by gaseous oxygen by using an ICP etching apparatus, and the surface three-dimensional patterns 5b, PDMS dot patterns, or PEO-SOG hole patterns were formed by using $O_2$ as a process gas at a chamber pressure of 0.015 Pa, an antenna power of 100 W, and a bias power of 100 W. After that, an etching/asking step was performed to obtain a master 6 including, as a feature, three-dimensional patterns having a dot pitch or hole pitch of 40 nm, a dot diameter or hole diameter of 20 nm or less, and a height of 20 nm.

When the hole-pattern master was used to form stamper projections under the electroless plating conditions presented in Example 1, it was confirmed by AFM that the plated three-dimensional patterns were inverted patterns in which the holes of the master were filled up to form dots. A master stamper manufactured by depositing an electroformed film after that had a dot form as the reverse of the patterns of the master, on the main body surface as shown in FIG. 4C. The dots and main body were made of NiP and Ni, i.e., different compositions, and the main body side had the boundary surface between the dot and main body. In this example, W was 20 nm and D was 10 nm, so that D/W was 0.5.

When X-ray analysis was performed on a film deposited under the above-mentioned plating conditions, the film was found to have an amorphous structure having only a broad peak near $2\theta=52°$. The dots of this stamper were also made of only NiP, i.e., an amorphous alloy composition, and the stamper main body was made of a crystalline metal containing Ni as a main component.

When this master stamper was used to repetitively duplicate and release mother stampers, the dot patterns neither broke nor deteriorated even when the number of repetitions exceeded 35.

Example 5

When the hole-pattern master disclosed in Example 4 was used to form stamper projections under the electroless plating conditions presented in Example 3, it was confirmed by AFM that the plated three-dimensional patterns were inverted patterns in which the holes of the master were filled up to form dots. A master stamper manufactured by depositing an electroformed film after that had a dot form as the reverse of the patterns of the master, on the main body surface as shown in FIG. 4C. The dots and main body were made of NiB and Ni, i.e., different compositions, and the main body side had the boundary surface between the dot and main body. When X-ray analysis was performed on a film deposited under the above-mentioned plating conditions, the film was found to have an amorphous structure having only a broad peak near $2\theta=53°$. The dots of this stamper were also made of only NiB, i.e., an amorphous alloy composition, and the stamper main body was made of a crystalline metal containing Ni as a main component.

In this example, W was 20 nm and D was 8 nm, so that D/W was 0.4.

When this master stamper was used to repetitively duplicate and release mother stampers, the dot patterns neither broke nor deteriorated even when the number of repetitions exceeded 45.

In Examples 1 to 5, the release resistance of the pattern projections in the duplicating/imprinting step increased.

Also, in Examples 4 and 5, the transfer properties were good even when the pattern width was 20 nm or less.

Comparative Example 1

In the stamper manufacturing process, electroless pre-processing was performed using, e.g., a sensitizer as a sensitivity imparting agent and an activator as a catalytic processing agent, and stamper projections were formed under the electroless plating conditions presented in Example 1. Consequently, it was confirmed by AFM that the plated three-dimensional patterns had a three-dimensional structure contrast lower than that in Example 1, and had an almost flat surface. This is so because the pre-processing activated the whole three-dimensional patterns, so no selective deposition occurred in the recesses alone, and the whole three-dimensional patterns were covered with the plating film. In a master stamper manufactured by depositing an electroformed film after that, therefore, the projections and main body were made of the same composition, unlike the structure shown in FIG. 4C. When X-ray analysis was performed on a film deposited under the above-mentioned plating conditions, the peaks of Sn and Pd mixed in the sensitizer and activator were confirmed, indicating that the projections of this stamper were not made of NiP as an amorphous alloy composition alone. In this comparative example, W was 50 nm, D was −2 nm, so that D/W was −0.04.

When this master stamper was used to repetitively duplicate and release mother stampers, the three-dimensional patterns broke and partially caused micro-size film peeling when the number of repetitions exceeded 2. This is so presumably because the catalyst layer on the outermost surface peeled off to deteriorate the form of the three-dimensional patterns.

Comparative Example 2

Figure 9A:
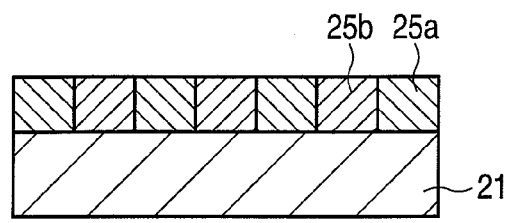
FIGS. 9A, 9B, and 9C are an exemplary view showing a process of manufacturing a master for comparison.
Figure 9B:
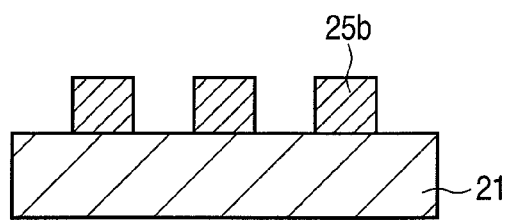
Figure 9C:
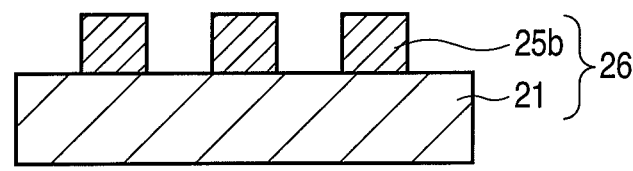

FIGS. 9A to 9C are views showing the steps of manufacturing a master for comparison.

As shown in FIG. 9A, surface three-dimensional latent image patterns 25a and 25b were formed on a substrate 1 without forming any conductive underlayer. Then, projecting patterns 25b were formed in the patterning step as shown in FIG. 9B, thereby obtaining a master 26 as shown in FIG. 9C. In the stamper manufacturing process of this comparative example, it was impossible to deposit three-dimensional patterns under the electroless plating conditions presented in Example 1. This is probably because there was no seed layer having catalytic activity and replacing the Pd conductive underlayer of Example 1.

Comparative Example 3

Figure 10A:
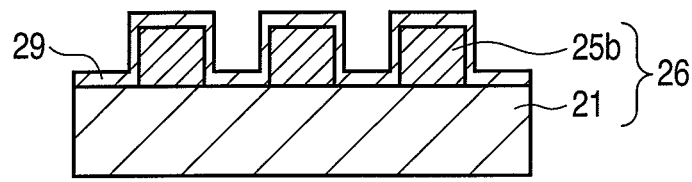
FIGS. 10A, 10B, and 10C are an exemplary view showing a step of manufacturing a master stamper for comparison.
Figure 10B:
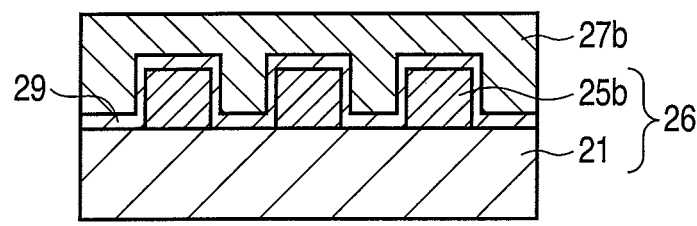
Figure 10C:
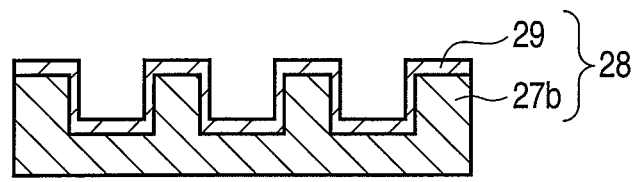

FIGS. 10A to 10C are views showing the steps of manufacturing a master stamper for comparison.

In the stamper manufacturing process as shown in FIG. 10A, the master 26 manufactured in Comparative Example 2 and having no conductive underlayer was used to deposit a 10-nm-thick Ni layer as a conductive seed layer 29 on the projecting patterns 25b at 0.5 Pa and 100 W for 45 s. After that, as shown in FIG. 10B, a stamper main body 27b was deposited by electroforming. As shown in FIG. 10C, a master stamper 28 in which the stamper main body 27b and seed layer 29 were integrated was released from the master 26 having no conductive underlayer. The projections and main body of the master stamper 28 were made of Ni, i.e., the same composition and a metal crystal. In this comparative example, W was 50 nm and D was −40 nm, so that D/W was −0.8.

When this master stamper 28 was used to repetitively duplicate and release mother stampers, the surface seed layer peeled off to deteriorate the patterns when the number of repetitions exceeded 10.

Comparative Example 4

The master disclosed in Example 4 was used to perform electroless pre-processing in the same manner as in Comparative Example 1, and form stamper projections under the electroless plating conditions presented in Example 1. Consequently, it was confirmed by AFM that the plated three-dimensional patterns had a three-dimensional pattern contrast lower than that in Example 1, and had an almost flat surface. In addition, a master stamper manufactured by depositing an electroformed film was entirely different from the master stamper structure as shown in FIG. 4C. That is, the main body surface had no projecting form, indicating that the three-dimensional patterns were not transferred. This is so perhaps because the pre-processing agent was unable to enter a size of 20 nm or less, and the catalytic effect necessary for electroless plating could not be obtained for the three-dimensional patterns.

Comparative Example 5

A master stamper was manufactured by simultaneously electroforming stamper projections and a main body by using the mater disclosed in Example 4, but no three-dimensional patterns could be transferred. This is so presumably because it was impossible to transfer the 20-nm three-dimensional patterns by electroforming, as the crystal grain size of an electroformed Ni crystal metal is generally large, i.e., 100 nm to 1 μm.

Comparative Example 6

The master disclosed in Example 4 was used to manufacture a master stamper by coating three-dimensional patterns with a 3-nm-thick Ni seed layer in the same manner as in Comparative Example 3, and electroforming a main body. The master stamper was found to have the three-dimensional patterns, but the pattern form was broken and depressed compared to the master, indicating bad transfer properties. That is, since the crystal grain size of a sputtered Ni crystal metal is 10 to 100 nm, the 3-nm-thick Ni sputtered film was not a uniform continuous film but an island-like deposited film, and no sufficient conductivity was obtained. This limited the accurate transfer of the 20-nm three-dimensional patterns. When this master stamper was used to repetitively duplicate and release mother stampers, the surface seed layer broke and the patterns deteriorated when the number of repetitions exceeded 2. In this comparative example, W was 20 nm and D was −17 nm, so that D/W was −0.85.

Comparative Example 7

FIGS. 11A to 11C are views showing the steps of manufacturing a master stamper for comparison.

Based on the master manufactured in Comparative Example 2 and having no conductive underlayer, a master 26 was manufactured by using an Ni conductive flat plate as a substrate 21 as shown in FIG. 9A, and stamper projections 27a were directly deposited on the Ni flat plate under the electroless plating conditions of Example 1. Subsequently, the surface three-dimensional patterns 25b were removed.

For example, the surface three-dimensional pattern layer of the resist was etched by using $O_2$ as a process gas at a chamber pressure of 0.1 Pa, an antenna power of 100 W, and a bias power of 5 W, thereby obtaining a master stamper 28'. In this comparative example, W was 50 nm and D was 0 nm, so that D/W was 0. When the master stamper 28' was used to repetitively duplicate and release mother stampers, the projections broke to expose the Ni flat plate in the patterns when the number of repetitions exceeded 10.

Comparative Example 8

In the stamper manufacturing process, stamper projections were formed by prolonging only the plating time to 30 s under the electroless plating conditions of Example 1. Consequently, it was confirmed by AFM that the plated three-dimensional patterns had a three-dimensional pattern contrast lower than that of Example 1, and had an almost flat surface. This is so because not only the recesses of the master were filled up to form projections, but also the projections themselves connected to each other, as the plating time was prolonged. A master stamper manufactured by depositing an electroformed film after that did not have the master stamper structure as shown in FIG. 4C, but had a structure in which the projections connected to each other and the aggregate of the projections was in contact with the main body. In this comparative example, W was 50 nm and D was 100 nm, so that D/W was 2.

When this master stamper was used to repetitively duplicate and release mother stampers, dissociation occurred in the boundary surface between the projection aggregate and main body and the stamper broke when the number of repetitions exceeded 10.

Table 1 below shows the structure, the composition, and the three-dimensional pattern amount in the boundary surface of each of the examples and comparative examples.

TABLE 1

|  | Projection composition | Main body composition | Width in short-axis direction: W | Three-dimensional pattern depth: D | Three-dimensional pattern amount: X | Transfer critical count: Y |
| --- | --- | --- | --- | --- | --- | --- |
| Example 1 | Amorphous NiP | Crystalline Ni | 50 | 30 | 0.6 | 50 |
| Example 2 | Amorphous NiP | Crystalline Ni | 50 | −25 | −0.5 | 40 |
| Example 3 | Amorphous NiB | Crystalline Ni | 50 | 20 | 0.4 | 60 |
| Example 4 | Amorphous NiP | Crystalline Ni | 20 | 10 | 0.5 | 35 |
| Example 5 | Amorphous NiB | Crystalline Ni | 20 | 8 | 0.4 | 45 |
| Comparative Example 1 | Amorphous NiP + α | Crystalline Ni | 50 | −2 | −0.04 | 2 |
| Comparative Example 2 | — | — | 50 | — | — | — |
| Comparative Example 3 | Crystalline Ni | Crystalline Ni | 50 | −40 | −0.8 | 10 |
| Comparative Example 4 | — | — | 20 | — | — | — |
| Comparative Example 5 | — | — | 20 | — | — | — |
| Comparative Example 6 | Crystalline Ni | Crystalline Ni | 20 | −17 | −0.85 | 2 |
| Comparative Example 7 | Amorphous NiP | Crystalline Ni | 50 | 0 | 0 | 10 |
| Comparative Example 8 | Amorphous NiP | Crystalline Ni | 50 | 100 | 2 | 10 |

The three-dimensional pattern depth D was confirmed by an AFM image or sectional transmission electron micrograph (TEM). FIG. 12 is a graph showing the relationship between the stamper three-dimensional pattern amount and transfer critical count based on Table 1. As shown in FIG. 12, in each of Examples 1 to 5, D/W was −0.6 to −0.4 or +0.4 to +0.6, and the transfer critical count was much better than those of the comparative examples. Accordingly, D/W of the projecting structure is desirably −0.6 to −0.4 or +0.4 to +0.6.

Also, in the master used in each example, the underlayer having catalytic activity is exposed to the recess of the three-dimensional form. Therefore, the selective deposition properties are superior to those of the dry process such as the conventional sputtering method. Since a film is entirely uniformly deposited in the conventional dry process, the bottom and sidewalls of a recess are simultaneously deposited, and a void readily forms in the recess. This causes a pattern defect during release. In each embodiment, however, the layers are sequentially deposited by electroless plating from only the catalytic underlayer on the bottom of the recess. Therefore, a void hardly forms in the recess, and the release durability significantly improves. In addition, an amorphous film is selectively deposited in the recess because electroless Ni plating is used. Since no crystal grains exist unlike in a metal crystal film deposited by the conventional electroplating or sputtering, a fine pattern of 20 nm or less can be deposited without any void. The stamper manufacturing method according to each embodiment can provide a stamper having release durability higher than those of the conventional stampers, and capable of transferring the forms of fine patterns.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stamper manufacturing method comprising:
   providing a master that comprises:
      a substrate,
      a conductive underlayer on the substrate with catalytic activity,
      projecting patterns without catalytic activity and at least partially on a surface of the conductive underlayer with catalytic activity, and
      regions where the conductive underlayer with catalytic activity is exposed between the projecting patterns,
   depositing an amorphous conductive layer by electroless plating between the projecting patterns and in the regions where the conductive underlayer is exposed in order to form stamper projections having a size in the range of 10 nm and 100 nm;
   electroplating on the stamper projections comprising the projecting patterns and the amorphous conductive layer with the amorphous conductive layer and the conductive underlayer as electrodes in order to form a stamper main body comprising a crystalline metal; and
   removing a stamper comprising the stamper projections and the stamper main body from the master.

2. The method of claim 1, wherein the electroless plating comprises:
   depositing the amorphous conductive layer in a position lower than the projecting patterns or a position higher than the projecting patterns.

3. The method of claim 1, wherein the stamper projections are made of an amorphous alloy composition of nickel, and the crystalline metal contains nickel as a main component.

4. The method of claim 1, wherein the conductive underlayer comprises a material having a resistance to reactive ion etching (RIE), a low electrical resistance and configured to exert a strong catalytic action on the electroless plating.

5. The method of claim 4, wherein the material comprises at least one metal selected from the group consisting of Pd, Al, Ti, Fe, Co, Cu, Ag, Ta, W, Au, Ni, Ru, and Pt.

6. The method of claim 1, wherein the stamper projections are made of an amorphous alloy composition comprising a metal selected from the group consisting of Ni, Co, Pd, Cu, Ag, and Au.

* * * * *